May 3, 1949. F. J. PILIA 2,468,806
WATER COOLED GAS BLANKETED ARC WELDING TORCH
Filed May 10, 1946
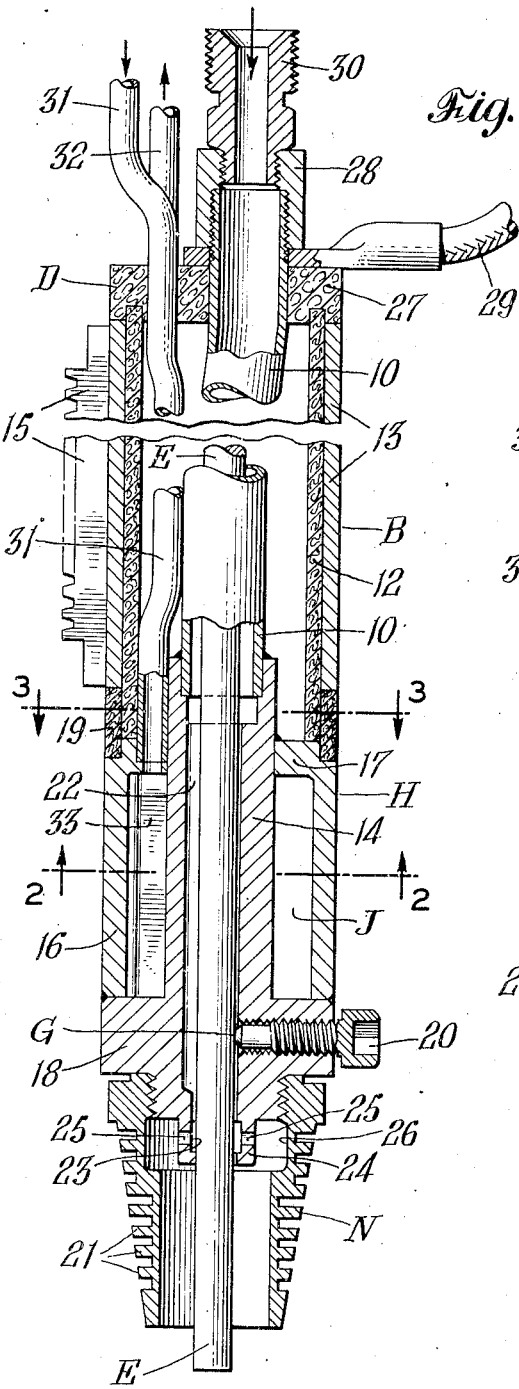
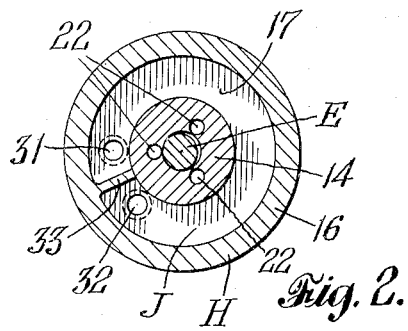
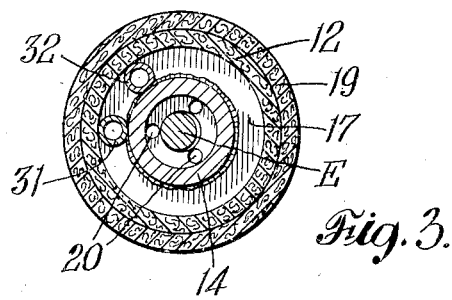
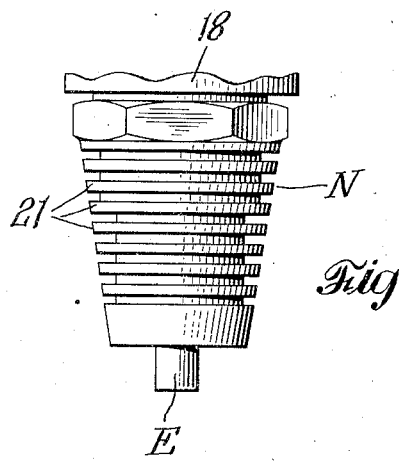
INVENTOR
FRANK J. PILIA
BY
ATTORNEY Patented May 3, 1949

2,468,806

UNITED STATES PATENT OFFICE 2,468,806

WATER-COOLED GAS BLANKETED ARC-WELDING TORCH

Frank J. Pilia, Riverside, N. J., assignor to The Linde Air Products Company, a corporation of Ohio Application May 10, 1946, Serial No. 668,945

6 Claims. (Cl. 219—15)

This invention relates to welding torches of the inert gas blanketed arc welding type, such for example as those disclosed in Meredith Patent No. 2,376,265, and more particularly to the water-cooled type disclosed in the copending application of Breymeier, Serial No. 604,834, filed July 13, 1945.

Torches of this character heretofore constructed have comprised a massive steel body which required expensive and complicated machining to provide not only the bore for the electrode, but also the respective passages for the inert gas and the cooling water. The massive construction resulted in heavy weight and heat-retaining capacity. Also the cooling chamber was small, and was located between the arc and the gripping means.

The objects of the present invention are therefore to avoid these disadvantages, and to simplify and improve the construction and operation of torches of this character, to increase the capacity of the cooling jacket, to cool a greater length of the electrode, to cool the electrode gripping means directly, to reduce the weight and heat-retaining capacity of the torch, to provide a fabricated or hollow construction, to improve the insulation, and to reduce the cost of manufacture.

Other objects and features of novelty will be apparent from the following description and the accompanying drawings, in which Fig. 1 is a longitudinal section through the torch according to the preferred embodiment of the present invention;

Fig. 2 is a transverse section taken along the line 2—2 of Fig. 1;

Fig. 3 is a transverse section taken along the line 3—3 of Fig. 1; and

Fig. 4 is an elevation of the lower end of the torch shown in Fig. 1.

The torch shown in the drawings comprises in general a barrel B which forms the main body of the torch. At its front or lower end the barrel B is provided with a welding head H, which comprises gripping means G for holding in position an electrode E, a water jacket J which cools the gripping means G and a considerable length of the electrode E, and a nozzle N which surrounds the projecting end of the electrode E. The rear or upper end of the barrel B is provided with a header D for supplying gas to the nozzle N, cooling medium to the jacket J, and electric welding current to the gripping means G.

In the torch shown in Fig. 1, the barrel B comprises several tubes one inside the other, preferably in concentric relation. The innermost tube 10 is of electrically conductive metal, and forms a housing for the electrode E, and a conduit for gas to the nozzle N. The outermost tube 13 is also of metal, and forms a protective outer shell. An intermediate tube 12 of electrical insulating material forms an insulating lining for the outer shell 13, and also encloses a tubular space around the electrode housing tube 10. The outer shell 13 has rigidly secured thereto a longitudinally extending toothed rack 15 so as to fit a conventional blowpipe holder and engage the adjusting gear thereof.

The welding head H comprises an electrode guide sleeve 14 of metal which has a central bore in which the end of the electrode housing tube 10 is secured, and which receives the electrode E therefrom. The sleeve 14 forms the inner wall of the cooling jacket J. A metal inverted cup member 16 forms the outer wall of the cooling jacket, and has an inturned flange 17 secured to the guide sleeve 14, forming the top of the cooling jacket. The guide sleeve 14 has an annular flange 18 forming the bottom wall of the cooling jacket, and to which the lower rim of the cup 16 is secured. The metal parts of the welding head H are secured together and to the tube 10 by welding or silver solder.

The lower rim of the insulating tube 12 abuts the flange 17, and the outer shell 13 is flush with the outer surface of the cup 16, an insulating sleeve 19 being fitted in a groove in the flange 17 to space and electrically insulate the metal shell 13 from the metal cup 16.

A set screw 20 extends through a threaded hole in the flange 18 to engage the electrode E in the guide sleeve 14 to form the gripping means G. Below the shoulder 18 the sleeve 14 is threaded to receive the nozzle N, which is formed with cooling fins 21 preferably by grooves turned in the outside wall thereof.

The sleeve 14, in addition to the central bore which receives the electrode, has a plurality of small longitudinal bores 22, which communicate with the interior of the electrode housing tube 10, and extend down to an annular chamber 23 inside a boss 24 below the threaded portion of the sleeve 14. Radial bores 25 lead from the chamber 23 to the inside of the nozzle N, which has an enlarged annular recess 26 to receive the gas from the bores 25.

The top or rear end of the barrel B is secured to the header D which comprises a cap or fitting 27 of insulating material, having an aperture through which the electrode housing tube 10 passes, and a groove which receives the upper end of the insulating tube 12. A nut 28 is screwed onto the projecting end of the tube 10, and clamps in place a terminal for a lead-in cable 29. The nut 28 also clamps the insulating tube 12 between the cap 27 and the flange 17, and clamps the outer shell 13 and insulating sleeve 19 between the cap 27 and the groove in the side wall 16. The nut 28 also receives a coupling 30 for a hose to supply gas to the interior of the tube 10.

Also passing through the cap 27 are water inlet tube 31 and water outlet tube 32, for cooling medium for the cooling jacket J. These tubes pass down through the space inside the tubes 12 and 13 but outside of the electrode housing tube 10, and are secured in suitable apertures in the flange 17 in fluid-tight relation, by welding or silver solder. A partition 33 extends from the guide sleeve 14 to the cup 16 between the openings for the tubes, so as to insure circulation of the cooling medium through the jacket J.

In setting up the torch for operation, the tungsten, molybdenum, or similar substantially nonconsumable electrode E is inserted in the bore of the electrode holder 14, and projects into the electrode housing tube 10, and is clamped in position by the set screw 20, with the lower end of the electrode projecting out of the nozzle N a short distance.

The electrode being installed, and the outer shell 13 and the rack 15 being mounted in a blowpipe or similar holder on a suitable propelling machine therefor, the water inlet pipe 31 is connected to a suitable supply of clean water under pressure, the water outlet pipe 32 is connected to a suitable drain, and the lead-in wire 29 is connected to a suitable source of electric welding current, and the coupling 30 is connected to a supply hose for helium, argon or other inert gas under pressure.

To start the welding, the rack 15 is advanced toward the work by the adjusting knob on the blowpipe holder, which turns a pinion meshing with the toothed rack 15 until an arc is struck between the electrode E and the work. The propelling machine is operated at welding speed to advance the torch along the desired line of weld. The electric welding current from the lead-in cable 29 passes through the electrode housing tube 10, the electrode guide sleeve 14 and set screw 20 to the electrode E and so through the arc to the work.

The inert gas from the supply hose passes through the coupling 30 and along inside the tube 10 outside of the electrode to the passages 22, chamber 23 and holes 25 into the recess 26, from which it flows out in an annular stream surrounding the arc end of the electrode. The cooling water from the tube 31 passes into the water jacket J, circulates around therein, and passes out through the tube 32.

While this embodiment of the invention has been described in detail, it is to be understood that the invention is not to be limited to these precise details, but instead the invention embraces such modifications of the broad idea as fall within the scope of the appended claims.

What is claimed is:

1. In a gas blanketed arc welding torch, an electrically conductive electrode support sleeve, electrically conductive electrode contacting means mounted on said sleeve, means for supplying electric welding current through said support sleeve and contacting means to the electrode, a nozzle mounted on said sleeve and having an internal surface of revolution concentric with the electrode and extending beyond said gripping means toward the arc to form with the electrode an annular gas passage terminating in an annular orifice, rigid annular walls above said contacting means and nozzle and outside of said electrode support sleeve and concentric with the electrode and forming an annular cooling chamber, said electrode support sleeve having a passage extending therethrough adjacent the electrode and inside of said annular cooling chamber for supplying gas to the interior of said surface of revolution to flow through said annular passage and out through said annular orifice.

2. In a gas blanketed arc welding torch, a metal tube constituting both an electric current conductor and a gas conduit, an electrically conductive electrode support sleeve connected to said tube, electrically conductive electrode contacting means mounted on said sleeve, a nozzle mounted on said sleeve and having an internal surface of revolution concentric with the electrode and extending beyond said contacting means toward the arc to form with the electrode an annular gas passage terminating in an annular orifice, a rigid annular wall surrounding said electrode support sleeve above said contacting means and nozzle and below said tube and concentric with the electrode and forming with said electrode support sleeve an annular cooling chamber, said electrode support sleeve having a gas passage therethrough establishing communication inside said chamber to the interior of said surface of revolution to flow through said annular gas passage and out through said annular orifice.

3. In a gas blanketed arc welding torch, a metal tube constituting both an electric current conductor and a gas conduit, electrically conductive electrode contacting means at the end portion of said metal tube toward the arc, means for supplying electric welding current through said metal tube and contacting means to the electrode, a nozzle mounted on said metal tube and extending beyond said contacting means toward the arc to form with the electrode an annular gas passage terminating in an annular orifice, rigid arcuate walls above said contacting means and outside of the inner wall of said metal tube and concentric with the electrode and forming an arcuate cooling chamber, a hollow outer shell surrounding said metal tube, and cooling water conduits passing through the space inside said shell and outside of said metal tube for supplying cooling water to said cooling chamber, said metal tube having a longitudinal passage extending therethrough from above said arcuate cooling chamber past said contacting means for supplying gas to the interior of said nozzle to flow through said annular gas passage and out through said annular orifice.

4. In a gas blanketed arc welding torch, an electrically conductive electrode support sleeve, electrically conductive electrode contacting means mounted on said sleeve, means for supplying electric welding current through said support sleeve and contacting means to the electrode, a nozzle mounted on said sleeve and extending beyond said contacting means toward the arc to form with the electrode an annular gas passage terminating in an annular orifice, rigid arcuate walls above said contacting means and outside of the inner wall of said electrode support sleeve and concentric with the electrode and forming an arcuate cooling chamber, said electrode support sleeve having a longitudinal passage extending therethrough from above said arcuate cooling chamber past said contacting means for supplying gas to the interior of said nozzle to flow through said annular gas passage and out through said annular orifice, a tubular outer shell having said contacting means and nozzle mounted at one end thereof, and a fitting at the opposite end of said shell having passages therethrough for inlet and outlet tubes for said cooling medium for said rigid walled annular cooling chamber.

5. In a gas blanketed arc welding torch, an electrically conductive electrode support sleeve, electrically conductive electrode contacting means mounted on said sleeve, means for supplying electric welding current through said support sleeve and contacting means to the electrode, a nozzle mounted on said sleeve and extending beyond said gripping means toward the arc close to the electrode to form therewith an annular gas passage terminating in an annular orifice, rigid arcuate walls above said contacting means and outside of the inner wall of said electrode support sleeve and concentric with the electrode and forming an arcuate cooling chamber, said nozzle having external cooling fins subject to the cooling action of the ambient air, and said electrode support sleeve having a passage extending therethrough from above said annular cooling chamber and past said contacting means for supplying gas to the interior of said nozzle to flow through said annular passage and out through said annular orifice.

6. In a gas blanketed arc welding torch, an electrically conductive electrode support sleeve, electrically conductive electrode contacting means mounted on said sleeve, means for supplying electric welding current through said support sleeve and contacting means to the electrode, a nozzle mounted on said sleeve and extending beyond said contacting means toward the arc to form with the electrode and annular gas passage terminating in an annular orifice, an arcuate cooling chamber on said electrode support sleeve above said contacting means and concentric with the electrode, said electrode support sleeve having a passage therein for supplying gas from above said arcuate cooling chamber past said contacting means to the interior of said nozzle to flow through said annular gas passage and out through said annular orifice.

FRANK J. PILIA.

REFERENCES CITED

The following references are of record in the file of this patent:

UNITED STATES PATENTS

| Number | Name | Date |
|---|---|---|
| 1,553,543 | Lincoln | Sept. 15, 1925 |
| 1,862,653 | Bean | June 14, 1932 |
| 1,946,305 | Catlett | Feb. 6, 1934 |
| 2,052,796 | Rava | Sept. 1, 1936 |
| 2,063,467 | Southgate | Dec. 8, 1936 |
| 2,106,692 | Embleton | Jan. 25, 1938 |
| 2,314,628 | Pavlecka | Mar. 23, 1943 |
| 2,376,265 | Meredith | May 15, 1945 |

Certificate of Correction

May 3, 1949.

Patent No. 2,468,806.

FRANK J. PILIA

It is hereby certified that error appears in the printed specification of the above numbered patent requiring correction as follows:

Column 4, line 3, claim 1, for the word "gripping" read *contacting*; and that the said Letters Patent should be read with this correction therein that the same may conform to the record of the case in the Patent Office.

Signed and sealed this 25th day of October, A. D. 1949.

[SEAL]

THOMAS F. MURPHY,
*Assistant Commissioner of Patents.*